United States Patent
Erel Caglar et al.

(10) Patent No.: US 12,427,896 B2
(45) Date of Patent: Sep. 30, 2025

(54) CHILD RESTRAINT

(71) Applicant: Dorel Juvenile Group, Inc., Foxboro, MA (US)

(72) Inventors: Erinc Erel Caglar, Devens, MA (US); Jason H. Johnson, Brownstown, IN (US); Nathan W. Heisey, Seymour, IN (US); Said S. Nakhla, Daphne, AL (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 182 days.

(21) Appl. No.: 18/377,488

(22) Filed: Oct. 6, 2023

(65) Prior Publication Data
US 2024/0116411 A1    Apr. 11, 2024

Related U.S. Application Data

(60) Provisional application No. 63/384,263, filed on Nov. 18, 2022, provisional application No. 63/414,135, filed on Oct. 7, 2022.

(51) Int. Cl.
*B60N 2/28* (2006.01)

(52) U.S. Cl.
CPC ......... *B60N 2/2806* (2013.01); *B60N 2/2827* (2013.01); *B60N 2/2869* (2013.01)

(58) Field of Classification Search
CPC ............................ B60N 2/2827; B60N 2/2869
See application file for complete search history.

(56) References Cited

U.S. PATENT DOCUMENTS

| | | | |
|---|---|---|---|
| 5,884,967 A | 3/1999 | Gasper | |
| 7,029,069 B2 | 4/2006 | Hendren et al. | |
| 7,216,932 B2 | 5/2007 | Emmert | |
| 7,597,396 B2 | 10/2009 | Longenecker | |
| 7,753,445 B2 | 7/2010 | Kassai | |
| 7,988,230 B2 | 8/2011 | Heisey | |
| 8,262,161 B2 | 9/2012 | Fritz et al. | |
| 8,845,022 B2 | 9/2014 | Strong | |
| 9,365,135 B2 | 6/2016 | Carpenter | |
| 9,415,706 B2 | 8/2016 | Rabeony | |
| 9,469,222 B2 | 10/2016 | Williams | |
| 10,710,478 B2 | 7/2020 | Reaves | |
| 2017/0120783 A1 | 5/2017 | Denbo | |

(Continued)

FOREIGN PATENT DOCUMENTS

| | | | |
|---|---|---|---|
| EP | 1145898 A1 | 10/2001 | |
| FR | 2946582 A1 | 12/2010 | |

OTHER PUBLICATIONS

Office Action (Non-Final Rejection) dated May 20, 2025 for U.S. Appl. No. 18/377,079 (pp. 1-6).

*Primary Examiner* — Adam C Ortiz
(74) *Attorney, Agent, or Firm* — Barnes & Thornburg LLP

(57) ABSTRACT

A child restraint includes a seat base adapted to be secured to a vehicle seat. The seat base includes a seat-base foundation formed to include a vehicle seatbelt path and a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat. The child restraint further includes a juvenile seat adapted to be secured to the seat base and a seat connection system configured to maintain connection between the juvenile seat and the seat base.

19 Claims, 4 Drawing Sheets

(56) References Cited

U.S. PATENT DOCUMENTS

| | | |
|---|---|---|
| 2021/0178938 A1 | 6/2021 | Williams |
| 2021/0237626 A1 | 8/2021 | Longenecker |
| 2021/0394653 A1 | 12/2021 | Li |

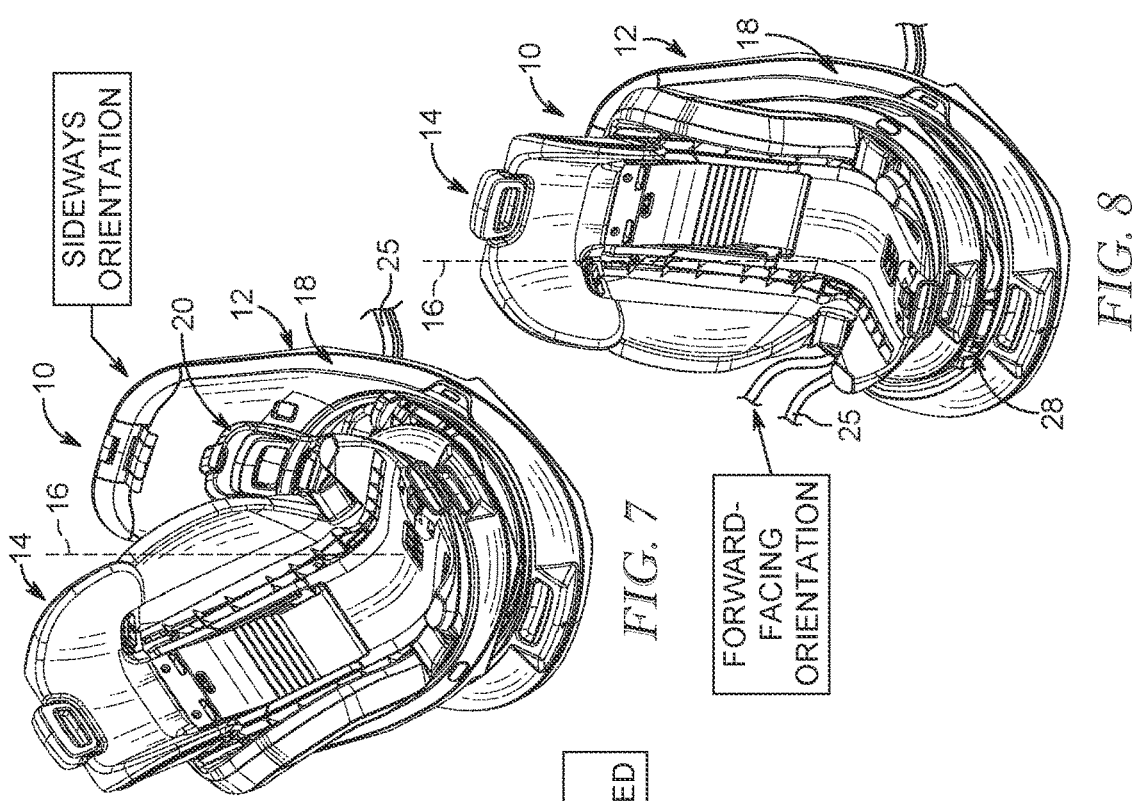
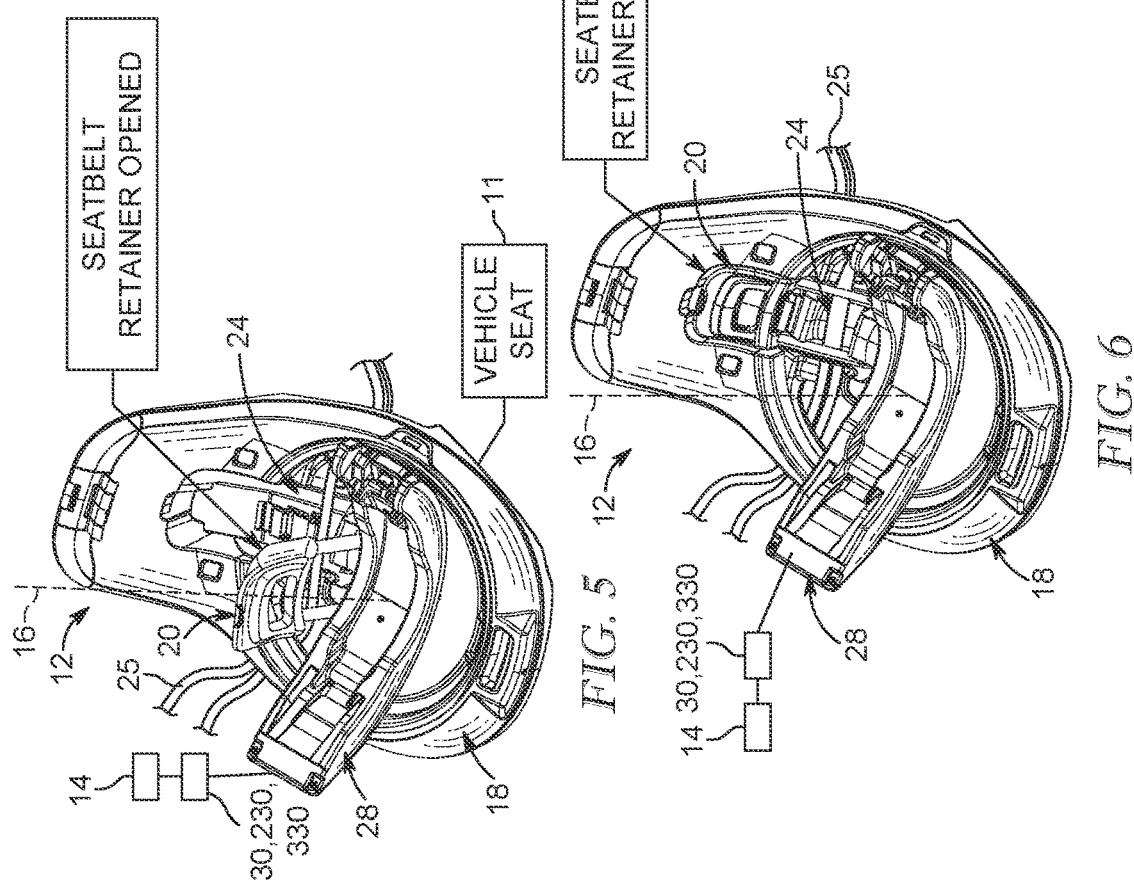

CHILD RESTRAINT

PRIORITY CLAIM

This application claims priority under 35 U.S.C. § 119(e) to U.S. Provisional Patent Application No. 63/414,135, filed Oct. 7, 2022 and to U.S. Provisional Patent Application No. 63/384,263, filed Nov. 18, 2022, the disclosures of each of which are expressly incorporated by reference herein.

BACKGROUND

The present disclosure relates to child safety devices, and particularly to child seats. More particularly, the present disclosure relates to child seat for use in a vehicle.

SUMMARY

According to the present disclosure, a child restraint, in accordance with the present disclosure, includes a seat base adapted to be secured to a vehicle seat. The seat base includes a seat-base foundation formed to include a vehicle seatbelt path and a vehicle seatbelt retainer coupled to the seat-base foundation. The vehicle seatbelt retainer is configured to pivot between an opened or released position and a closed or clamped position. In the released position, the vehicle seatbelt retainer is spaced away from the vehicle seatbelt path. In the clamped position, the vehicle seatbelt retainer overlies the vehicle seatbelt path and clamps a vehicle seat belt to the seat-base foundation to secure the seat base to the vehicle seat.

In illustrative embodiments, the seat base further includes a seat-orientation controller coupled to the seat-base foundation. The seat-orientation controller is movable relative to the seat-base foundation and the vehicle seatbelt retainer. For example, the seat-orientation controller may be rotatable about a vertical rotation axis between a first position (i.e. a sideways orientation) in which the seat-orientation controller overlies the vehicle seatbelt retainer and blocks the vehicle seatbelt retainer from moving from the clamped position to the released position, and a second position (i.e. a forward-facing orientation or a rearward-facing orientation), in which the vehicle seatbelt retainer is exposed and is moveable between the clamped position and the released position.

In illustrative embodiments, the child restraint further includes a juvenile seat coupled to the seat base and configured to hold a child for transportation in a vehicle. In the illustrative embodiment, the juvenile seat is coupled directly to the seat-orientation controller for movement therewith relative to the seat-base foundation and to the vehicle seatbelt retainer. In other embodiments, the juvenile seat may be coupled directly to the seat-base foundation and the seat-orientation controller may be omitted.

In illustrative embodiments, the child restraint further includes a seat connection system configured to maintain connection between the juvenile seat and the seat-orientation controller or between the seat-base foundation and the juvenile seat. The juvenile seat is movable relative to the seat base between a use position and a base-installation position. In the use position, the juvenile seat is installed upright on the seat-orientation controller and can rotate about the vertical rotation axis with the seat-orientation controller. In the base-installation position, the juvenile seat is spaced apart from the seat base to provide clearance for the seatbelt retainer to move between the released position and the clamped position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a child restraint including a seat base and a juvenile seat adapted to be secured to the seat base, the seat base having a seat-base foundation configured to mount to a vehicle seat and a vehicle seatbelt retainer configured to move from a released or opened position to expose a belt path surface of the seat base foundation and a clamped or closed position to clamp a vehicle seatbelt to the seat-base foundation while the juvenile seat is at least partially separated from the seat base;

FIG. 2 is a perspective view of the child restraint showing that the child restraint further includes a seat connection system configured to maintain connection between the juvenile seat and the seat base, the seat connection system including a hinge interconnecting a front end of the juvenile seat and the seat base to allow the juvenile seat to move from a use or installed position on the seat base to the base-installation position exposing the vehicle seatbelt retainer, and showing that the seat connection system may further include a seat support configured to support the juvenile seat in the base-installation position while a user opens and closes the vehicle seatbelt retainer to install the child restraint on a vehicle seat;

FIG. 3 is a perspective view of a second embodiment of a child restraint including a seat base, a juvenile seat adapted to be secured to the seat base, and a seat connection system configured to maintain connection between the seat base and the juvenile seat while the juvenile seat is in a base-installation position so that a user is able to access and move a vehicle seatbelt retainer between a released position and a clamped position, the seat connection system including a hinge interconnecting a rear end of the juvenile seat and the seat base;

FIG. 4 is a perspective view of a third embodiment of a child restraint including a seat base, a juvenile seat adapted to be secured to the seat base, and a seat connection system configured to maintain connection between the seat base and the juvenile seat while the juvenile seat is in a base-installation position so that a user is able to access and move a vehicle seatbelt retainer between a released position and a clamped position, the seat connection system including a first seat support interconnecting a front end of the juvenile seat and the seat base and a second seat support interconnecting a rear end of the juvenile seat and the seat base;

FIG. 5 is a perspective and diagrammatic view of the of the seat base showing the seatbelt retainer in the opened position to expose the belt path surface of the seat base foundation;

FIG. 6 is a view similar to FIG. 5 showing the seatbelt retainer in the closed position clamping the vehicle seat belt to the seat-base foundation;

FIG. 7 is a perspective view showing the juvenile seat mounted on the seat base in the use position and oriented in a sideways orientation after the seat-belt retainer has been moved to the closed position to clamp the vehicle seat belt to the seat-base foundation; and FIG. 8 is a perspective view showing the juvenile seat in the use position and rotated relative to the seat-base foundation to a forward-facing orientation to overlie the seat-belt retainer while the seat belt retainer is in the closed position.

DETAILED DESCRIPTION

Figure 1:
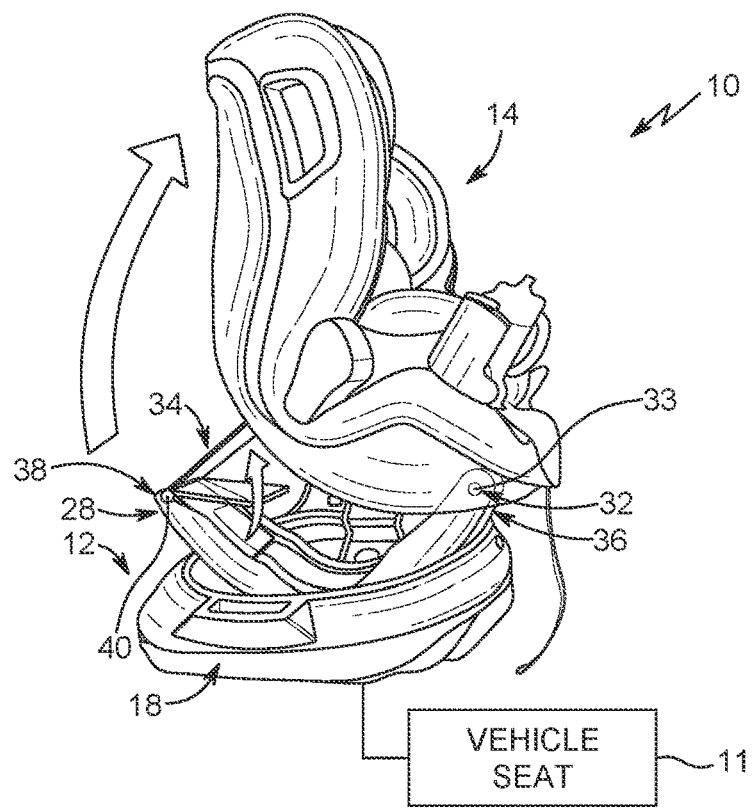

A child restraint 10 includes a seat base 12 adapted to rest on a vehicle seat 11 and a juvenile seat 14 coupled to the seat base 12 as shown in FIG. 1. The juvenile seat 14 is rotatable about a vertical rotation axis 16 to change the juvenile seat 14 from a forward facing orientation to a rearward facing orientation relative to the seat base 12. In some embodiments, the juvenile seat 14 is at least partially detachable from the seat base 12 so that the seat base 12 can be secured properly to the vehicle seat 11 prior to arrangement of the juvenile seat 14 in the forward facing orientation or the rearward facing orientation.

The seat base 12 includes seat base foundation 18 and a vehicle seat-belt retainer 20 mounted to the seat base foundation 18 for pivotable movement a retainer axis 22 between a released position and a clamped position. In the released position, a distal end of the vehicle seat-belt retainer 20 is spaced apart from the seat base foundation 18 to expose a vehicle seatbelt path 24. In the clamped position, the vehicle seat-belt retainer 20 overlies the vehicle seatbelt path 24 and is configured to clamp a vehicle seat belt between the vehicle seatbelt retainer 20 and the seat base foundation to secure the seat base 12 to the vehicle seat 11. Reference is hereby made to U.S. Publication No. US-2023/0045293 filed Aug. 5, 2022 and entitled SEAT BASE FOR A CHILD RESTRAINT for disclosure relating to use of a vehicle seat-belt retainer, which application is hereby incorporated in its entirety herein.

Figure 2:
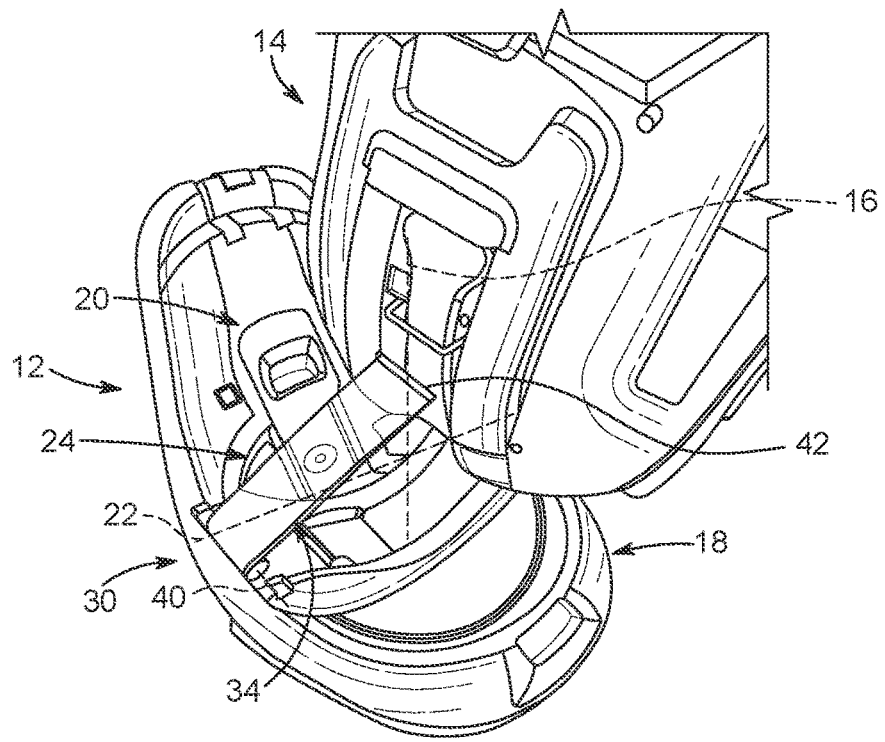

The seat base 12 may further include a seat-orientation controller 28 coupled to the seat-base foundation 18 as shown in FIGS. 1 and 2. The seat-orientation controller 28 is configured to secure the juvenile seat 14 to the seat base 12 and allows selective rotation of the juvenile seat 14 relative to the seat base foundation 18 about the vertical rotation axis 16 with the juvenile seat 14. The seat-orientation controller 28 may also allow selective recline of the juvenile seat 14 relative to the seat base foundation 18. In some embodiments, the vehicle seatbelt retainer 20 may only be able to move from the clamped position to the release position when the juvenile seat 14 is at least partially detached from the seat-orientation controller 28. Reference is hereby made to U.S. Provisional Application No. 63/419,505 filed Oct. 26, 2022 and entitled CHILD RESTRAINT for disclosure relating to use of a seat-orientation controller for juvenile seat attachment, rotation, and recline capabilities, which application is hereby incorporated in its entirety herein.

The child restraint 10 in the illustrative embodiment further includes a connector system 30 configured to maintain connection between the seat base 12 and the juvenile seat 14 when the juvenile seat 14 is at least partially detached from the seat-orientation controller 28 as shown in FIGS. 1 and 2. The connection system 30 includes a hinge 32 and a seat support 34. The hinge 32 is coupled to both the seat-orientation controller 28 and the juvenile seat 14 near a front end 36 of the seat-orientation controller 28 and the juvenile seat 14. The seat support 34 is coupled to a rear end 38 of the seat-orientation controller 28.

The juvenile seat 14 is pivotable about a hinge axis 33 provided by the hinge 32 from a use position to a base-installation position. In the use position, the juvenile seat 14 is fully installed on the seat-orientation controller 28. In the base-installation position, the juvenile seat 14 is detached from the rear end 38 of the seat-orientation controller 28 so as to move about hinge 32 away from the seat-orientation controller 28. In the base-installation position, the juvenile seat 14 is spaced a greater distance from the vehicle seatbelt retainer 20 to allow the vehicle seatbelt retainer 20 to move from the clamped position to the released position so that the vehicle seat belt can be attached to the seat base 12.

The seat support 34 is pivotable about a seat-support axis 40 from a stowed position to a support position as suggested in FIGS. 1 and 2. In the stowed positon, the seat support 34 is substantially flush with an upper surface of the seat-orientation controller 28 so that the juvenile seat 14 can assume the use position. The seat support 34 is movable to the support position when the juvenile seat 14 is in the detached positon. In the support position, the seat support 34 extends away from the upper surface of the seat-orientation controller 28 and a distal end 42 of the seat support 34 engages the juvenile seat 14 to support the juvenile seat 14 in the base-installation position. In some embodiments, the seat support 34 may include a rigid strip to support the juvenile seat 14 in compression while the juvenile seat 14 is in the base-installation position. In some embodiments, the seat support 34 may include a flexible strip to support the juvenile seat 14 in tension while the juvenile seat 14 is in the base-installation position.

In some embodiments, the seat support 34 may be omitted and the juvenile seat 14 may be pivoted about hinge 32 to a position in which the juvenile seat 14 is supported by a structure in its surroundings while a user installs the vehicle seat belt using vehicle seatbelt retainer 20. Some examples of structures include vehicle seat 11, another vehicle seat, or another portion of a vehicle including vehicle seat 11. The hinge 32 may be spring-loaded or gas assisted to control pivoting of the juvenile seat 14 from the base-installation position to the use position and/or from the use position to the base-installation position.

Figure 3:
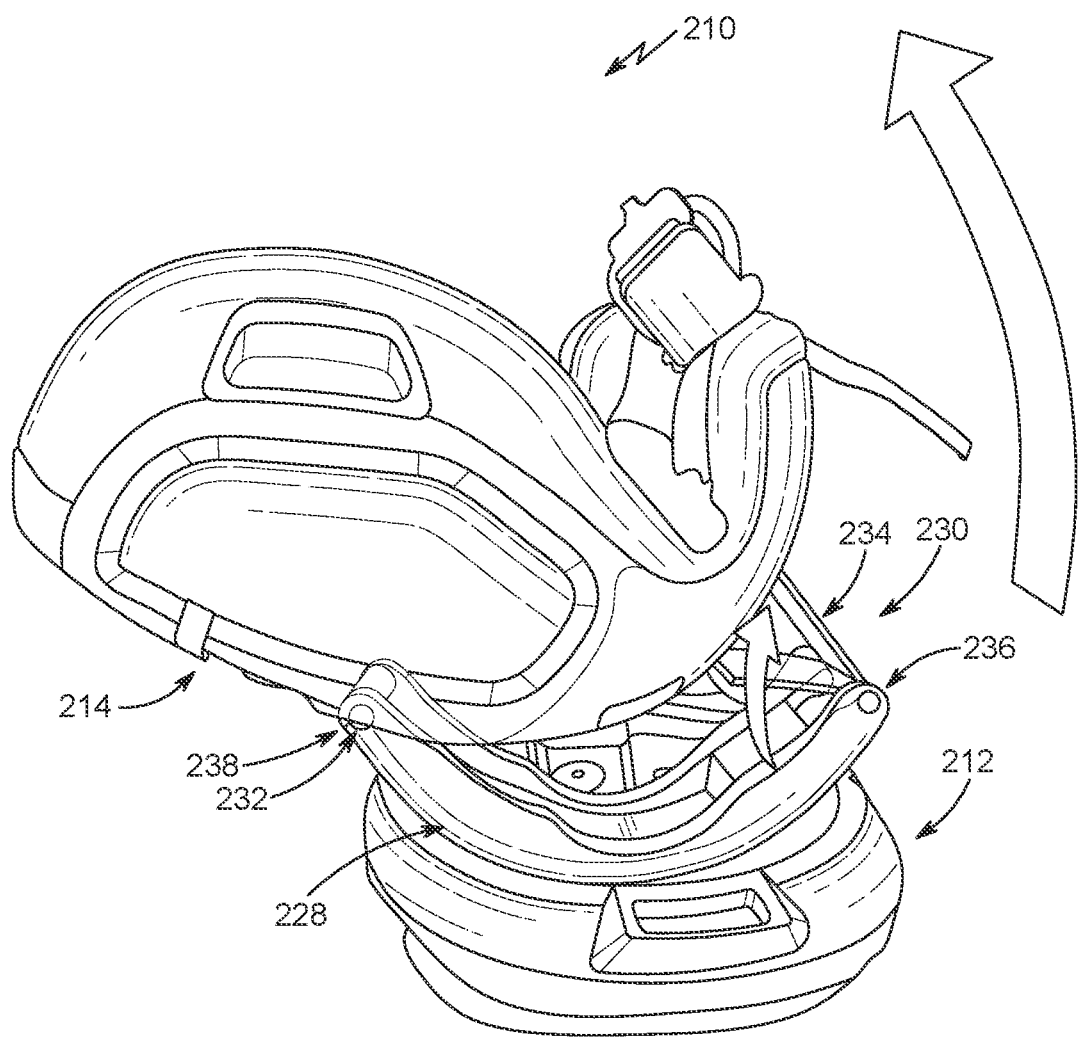

Another embodiment of a child restraint 210 is shown in FIG. 3. Child restraint 210 is substantially similar to child restraint 10 except that child restraint 210 includes a connector system 230 having a hinge 232 coupled to a rear end 238 of a seat-orientation controller 228. The connection system 230 further includes a seat support 234 coupled to a front end 236 of the seat-orientation controller 228. Thus, juvenile seat 214 pivots in an opposite direction away from seat-orientation controller 228 compared the child restraint shown and described in FIGS. 1 and 2.

Figure 4:
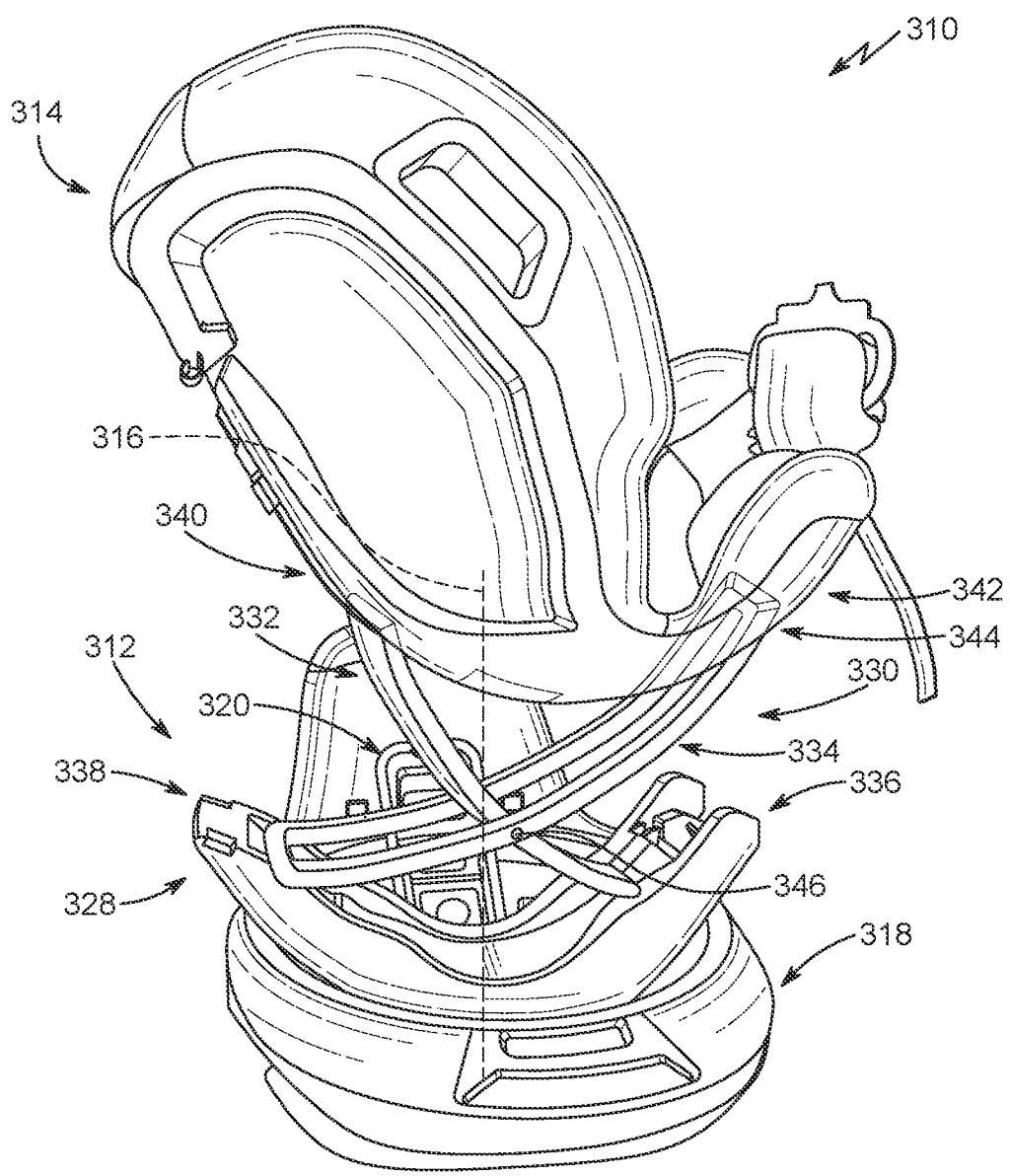

Another embodiment of a child restraint 310 is shown in FIG. 4. The child restraint 310 includes a seat base 312 and a juvenile seat 314 coupled to the seat base 312. The juvenile seat 314 is rotatable about a vertical rotation axis 316 to change the juvenile seat 314 from a forward facing orientation to a rearward facing orientation relative to the seat base 312. In some embodiments, the juvenile seat 314 is at least partially detachable from the seat base 312 so that the seat base 312 can be properly secured to a vehicle seat prior to arrangement of the juvenile seat 314 in the forward facing orientation or the rearward facing orientation.

The seat base 312 includes seat base foundation 318 and a vehicle seat-belt retainer 320 mounted to the seat base foundation 318 for pivotable movement a retainer axis between a released position and a clamped position. The seat base 312 may further include a seat-orientation controller 328 coupled to the seat-base foundation 318. In some embodiments, the vehicle seatbelt retainer 320 may only be able to move from the clamped position to the release position when the juvenile seat 314 is at least partially detached from the seat-orientation controller 328.

The child restraint 310 in the illustrative embodiment further includes a connector system 330 configured to maintain connection between the seat base 312 and the juvenile seat 314 when the juvenile seat 314 is at least partially detached from the seat-orientation controller 328. The connection system 330 includes a first seat support 332 and a second seat support 334. The first seat support 332 is coupled near a front end 336 of the seat-orientation controller 28 and a rear end 340 of the juvenile seat 314. The second seat support 334 is coupled near a rear end 338 of the seat-orientation controller 328 and a front end 342 of the juvenile seat 314. Specifically, the first and second seat supports 332, 334 are coupled to a seat bottom 344 of the juvenile seat 314.

The first and second seat supports 332, 334 cross near a center of each of the first and second seat supports 332, 334 at a central pivot axis 346. The juvenile seat 34 may be lifted upwardly away from the seat base 312 to cause pivoting of both the first and second seat supports 332, 334 relative to the seat base 312 and the juvenile seat 314 and relative to each other about the central pivot axis 346. An end of each seat support 332, 334 may translate relative to the seat base 312 and the juvenile seat 314 to allow each of the seat supports 332, 334 to pivot relative to one another. The first and second seat supports 332, 334 may be retained in position (i.e. by a lock, latch, resting in a notch, etc.) after the juvenile seat 314 is lifted upwardly to retain the juvenile seat 314 in a lifted position as shown in FIG. 4. Once in the lifted position, sufficient spacing or clearance is provided to access the vehicle seatbelt retainer 320 to install the child restraint on a vehicle seat. The child restraint 310 may further include a release button or actuator to unlock the first and second seat supports 332, 334 so that the juvenile seat 14 can be lowered onto the seat base 312 and secured to the seat-orientation controller 328.

FIGS. 5-8 show seat base 12 in various positions with juvenile seat 14. It should be noted that seat base 12 is substantially similar to seat base 212 and seat base 312. Accordingly, juvenile seats 214, 314 and connector systems 230, 330 can be used with the seat base 12 shown in FIGS. 5-8.

FIG. 5 shows the vehicle seatbelt retainer unlocked from the seat-base foundation 18 and in the opened position exposing the seatbelt path 24. To assume the opened position, the seat-orientation controller 28 has been rotated about the vertical rotation axis 16 to a sideways orientation. The juvenile seat 14 is shown diagrammatically in FIGS. 5 and 6 in the base-installation position while the seat-orientation controller 28 is in the sideways orientation. In these positions, the juvenile seat 14 and the seat-orientation controller 28 provide clearance for a user to open the seatbelt retainer 20 and route a vehicle seatbelt 25 across the seatbelt path 24 of the seat-base foundation 18. Once the vehicle seatbelt 25 is placed within the seatbelt path 24 the seatbelt retainer 20 can be pivoted to the closed position to clamp the vehicle seatbelt 25 in place and secure the child restraint 10 to the vehicle seat 11.

FIGS. 6 and 7 show the juvenile seat 14 in the use position after the seatbelt retainer 20 has been moved to the clamped position. The use position of the juvenile seat 14 can be a sideways orientation facing a door of the vehicle for child ingress and egress or a transportation orientation (i.e. forward-facing or rearward facing) for child transportation in the vehicle. It should be appreciated that the seat-orientation controller 28 is movable with the juvenile seat 14 to the sideways orientation or the transportation orientation.

The invention claimed is:

1. A child restraint comprising a seat base adapted to be secured to a vehicle seat, the seat base comprising a seat-base foundation formed to include a vehicle seatbelt path, a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat, and a seat-orientation controller coupled to the seat-base foundation and movable relative to the seat-base foundation and the vehicle seatbelt retainer about a vertical rotation axis between a first position in which the seat-orientation controller overlies the vehicle seatbelt retainer and blocks the vehicle seatbelt retainer from moving from the clamped position to the released position, and a second position, in which the vehicle seatbelt retainer is exposed and is moveable between the clamped position and the released position, a juvenile seat coupled to the seat-orientation controller for movement therewith relative to the seat-base foundation and to the vehicle seatbelt retainer, and a seat connection system configured to maintain connection between the juvenile seat and the seat-orientation controller, wherein the juvenile seat is movable relative to the seat base between a use position in which the juvenile seat is installed on the seat-orientation controller to rotate about the vertical rotation axis with the seat-orientation controller, and a base-installation position, in which the juvenile seat is spaced apart from the seat-orientation controller while the seat-orientation controller is in the second position so that the vehicle seatbelt retainer is free to pivot between the released position and the clamped position.

2. The child restraint of claim 1, wherein the seat connection system includes a hinge interconnecting the juvenile seat and the seat-orientation controller and the juvenile seat is pivotable relative to the seat-orientation controller about a hinge axis between the use position and the base-installation position.

3. The child restraint of claim 2, wherein the hinge is coupled to a rear end of the seat-orientation controller and a rear end of the juvenile seat.

4. The child restraint of claim 2, wherein the hinge is force-assisted to control pivoting of the juvenile seat from the base-installation position to the use position or from the use position to the base-installation position.

5. The child restraint of claim 4, wherein the hinge is spring-loaded.

6. The child restraint of claim 4, wherein the hinge is gas-assisted.

7. The child restraint of claim 2, wherein the seat connection system further includes a seat support coupled to a front end of the seat-orientation controller and pivotable between a stowed position, in which the seat support is substantially flush with an upper surface of the seat-orientation controller so that the juvenile seat can assume the use position, and a support position, in which the seat support extends away from the upper surface of the seat-orientation controller and a distal end of the seat support engages the juvenile seat to support the juvenile seat in the base-installation position.

8. The child restraint of claim 7, wherein the seat support includes a rigid strip such that the seat support is in compression while supporting the juvenile seat in a tilted position.

9. The child restraint of claim 7, wherein the seat support includes a flexible strip to support the juvenile seat in a tiled position such that the seat support is in tension while supporting the juvenile seat in a tilted position.

10. The child restraint of claim 2, wherein the hinge is coupled to a front end of the seat-orientation controller and a front end of the juvenile seat.

11. The child restraint of claim 10, wherein the seat connection system further includes a seat support coupled to a rear end of the seat-orientation controller and pivotable between a stowed position, in which the seat support is substantially flush with an upper surface of the seat-orientation controller so that the juvenile seat can assume the use position, and a support position, in which the seat support extends away from the upper surface of the seat-orientation controller and a distal end of the seat support engages the juvenile seat to support the juvenile seat in the base-installation position.

12. The child restraint of claim 1, wherein the seat connection system includes a first seat support coupled near a front end of the seat-orientation controller and a rear end of the juvenile seat and a second seat support coupled near a rear end of the seat-orientation controller and a front end of the juvenile seat.

13. The child restraint of claim 12, wherein the first and second seat supports cross near a center of each of the first and second seat supports at a central pivot axis, and wherein both the first and second seat supports pivot relative to the seat base and the juvenile seat and relative to each other about the central pivot axis when the juvenile seat is lifted upwardly away from the seat base from the use position to the base-installation position.

14. The child restraint of claim 1, wherein the vehicle seatbelt retainer is blocked from moving to the released position when the juvenile seat is in the use position and the seat-orientation controller is in the second position.

15. A child restraint comprising a seat base adapted to be secured to a vehicle seat, a juvenile seat coupled to the seat base, and a seat connection system configured to maintain connection between the juvenile seat and the seat base, wherein the juvenile seat is movable relative to the seat base between a use position in which the juvenile seat is installed on the seat base in a forward-facing orientation or a rearward-facing orientation, and a base-installation position, in which the juvenile seat is spaced apart from the seat base while connected to the seat base by the seat connection system; wherein the seat connection system includes a hinge interconnecting the juvenile seat and the seat base and the juvenile seat is pivotable relative to the seat base about a hinge axis between the use position and the base-installation position, and wherein the hinge is coupled to a rear end of the juvenile seat.

16. The child restraint of claim 15, wherein the hinge is force-assisted to control pivoting of the juvenile seat from the base-installation position to the use position or from the use position to the base-installation position.

17. The child restraint of claim 15, wherein the seat connection system includes a first seat support coupled near a rear end of the juvenile seat and a second seat support coupled near a front end of the juvenile seat.

18. The child restraint of claim 17, wherein the first and second seat supports cross near a center of each of the first and second seat supports at a central pivot axis, and wherein both the first and second seat supports pivot relative to the seat base and the juvenile seat and relative to each other about the central pivot axis when the juvenile seat is lifted upwardly away from the seat base from the use position to the base-installation position.

19. A child restraint comprising a seat base adapted to be secured to a vehicle seat, a juvenile seat coupled to the seat base, and a seat connection system configured to maintain connection between the juvenile seat and the seat base, wherein the juvenile seat is movable relative to the seat base between a use position in which the juvenile seat is installed on the seat base in a forward-facing orientation or a rearward-facing orientation, and a base-installation position, in which the juvenile seat is spaced apart from the seat base while connected to the seat base by the seat connection system; wherein the seat connection system includes a hinge interconnecting the juvenile seat and the seat base and the juvenile seat is pivotable relative to the seat base about a hinge axis between the use position and the base-installation position, and wherein the hinge is coupled to a front end of the juvenile seat.

* * * * *